US009211760B2

(12) United States Patent
Bajuyo

(10) Patent No.: US 9,211,760 B2
(45) Date of Patent: Dec. 15, 2015

(54) CONTAINER RETAINING DEVICE

(71) Applicant: Pivotal Products, LLC, South Bend, IN (US)

(72) Inventor: Antonio Bajuyo, South Bend, IN (US)

( * ) Notice: Subject to any disclaimer, the term of this patent is extended or adjusted under 35 U.S.C. 154(b) by 0 days.

(21) Appl. No.: 14/213,330

(22) Filed: Mar. 14, 2014

(65) Prior Publication Data

US 2014/0265382 A1     Sep. 18, 2014

Related U.S. Application Data

(60) Provisional application No. 61/793,342, filed on Mar. 15, 2013.

(51) Int. Cl.
*B65G 7/12* (2006.01)
*B44D 3/14* (2006.01)
*A45F 5/02* (2006.01)

(52) U.S. Cl.
CPC . *B44D 3/14* (2013.01); *A45F 5/021* (2013.01); *B65G 7/12* (2013.01); *Y10S 224/904* (2013.01)

(58) Field of Classification Search
CPC ............ B44D 3/14; B65G 7/12; A45F 5/021; Y10S 224/904
USPC .......... 294/27.1, 32, 15; 248/210, 211, 312.1, 248/692; 220/736, 759, 762, 763, 764, 774; 16/425
See application file for complete search history.

(56) References Cited

U.S. PATENT DOCUMENTS

| 2,786,707 | A | * | 3/1957 | Campbell | 294/34 |
| 4,053,131 | A | * | 10/1977 | Francis | 248/211 |
| D330,858 | S | * | 11/1992 | Harris | D9/455 |
| 5,482,339 | A | * | 1/1996 | Chishko, Jr. | 294/27.1 |
| 5,584,520 | A | * | 12/1996 | Niemeier | 294/34 |
| 5,778,489 | A | * | 7/1998 | Marshal, II | 16/425 |
| 5,806,709 | A | * | 9/1998 | Marshall, II | 220/755 |
| D456,578 | S | * | 4/2002 | Smith et al. | D32/54 |
| 7,387,323 | B1 | * | 6/2008 | Minnette et al. | 294/32 |
| 2002/0125385 | A1 | * | 9/2002 | Tweed | 248/213.2 |

* cited by examiner

*Primary Examiner* — Dean Kramer
(74) *Attorney, Agent, or Firm* — R. Tracy Crump

(57) ABSTRACT

A bucket holder is provided with a handle portion for ergonomically carrying and holding a bucket during transportation and use. The body portion is comprised of a surface pressed up against the can, while a hook opposite from the surface holds the bail in tension, using gravity and distance between the surface and the hook to maintain tension. The holder has at least one surface that can be pressed up against the can, allowing more than one position for the handle to be located.

14 Claims, 6 Drawing Sheets

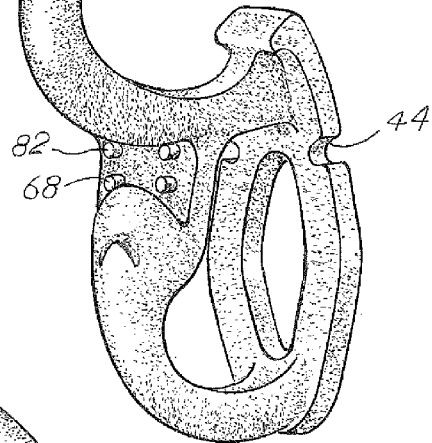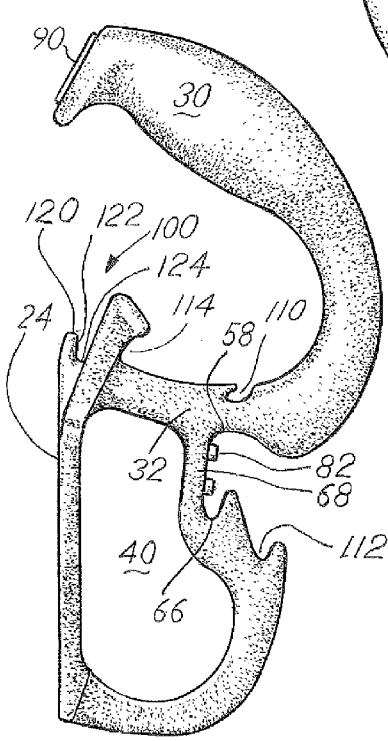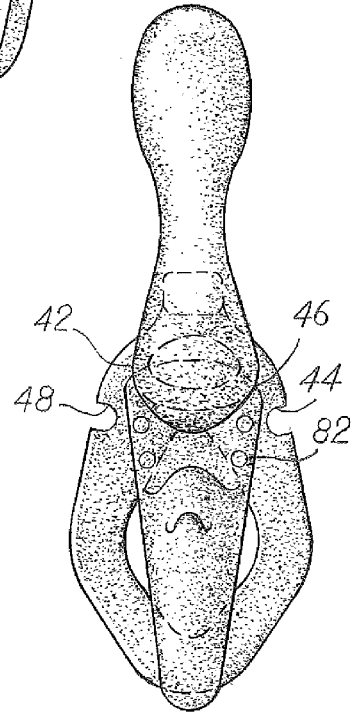

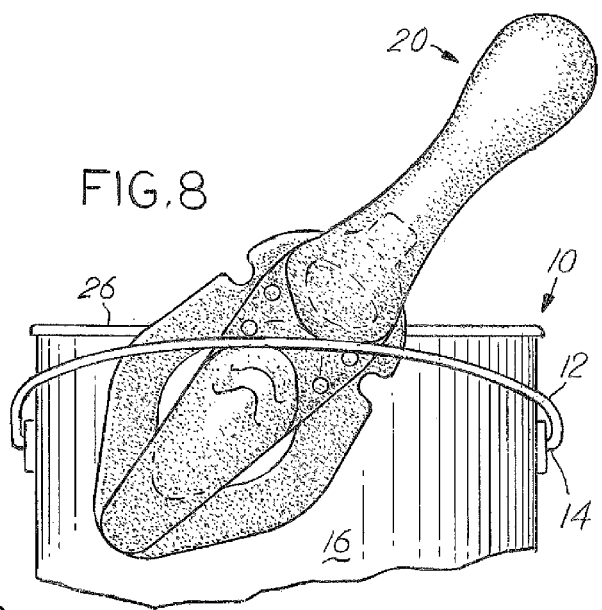
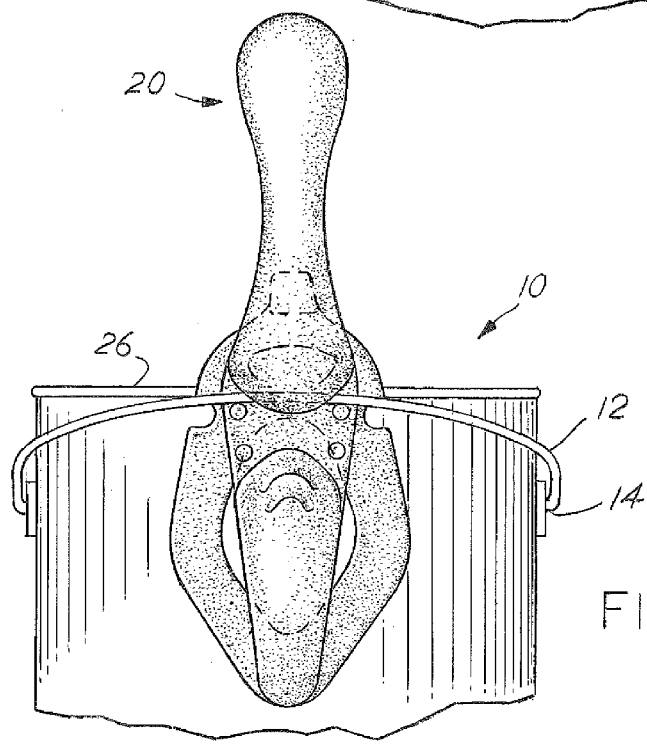

CONTAINER RETAINING DEVICE

CROSS-REFERENCE TO RELATED APPLICATION

This application claims the benefit of U.S. Provisional Application No. 61/793,342 filed Mar. 15, 2013, the disclosure of which is hereby incorporated by reference.

BACKGROUND OF THE INVENTION

This present disclosure relates to devices to ergonomically hold buckets with handles, specifically a paint bucket with a wire bail. Painting frequently requires the user to twist and hold their bodies in many positions, while at the same time, hold a bucket full of paint along with a wet paint brush. Frequently, the holding and carrying a bucket in various positions can cause fatigue, especially when the bail provided on the bucket is a relatively thin metal wire. Professional painters can suffer anywhere from various levels of discomfort to repetitive stress injuries. There are devices currently on the market that are designed to improve the ergonomics of painting by connecting to the bail and the bucket in some fashion and providing some sort of handle, but these do not allow the flexibility of putting the handle in more than one position. Most standard paint container bails are only designed for use in tension. These bails, when put in compression, can unexpectedly disengage from one or both pivots. Not only can this create an unwanted mess, but bail failure can be very dangerous if a painter is working on a ladder. The holding device solves this problem by keeping the bail in sufficient tension to safely function when gripping upward, downward, or somewhere in between. In addition, devices currently available do not have the flexibility to be used with multiple styles of cans.

SUMMARY OF THE INVENTION

The present disclosure describes a device for securely holding a common paint bucket using the outside surface of the can and the bail, but can apply to other storage vessels and containers that have a handle and an outside surface. By keeping one surface of the holder against the outside surface of the bucket on one side of the holder and keeping the bucket bail in tension by the opposite side of the holder, it is possible to use a more easily gripped device to hold the bucket. The present invention allows the holding device to be installed in various positions that allow easier access to the bucket's opening. It is also possible to securely hold the device to a ladder in several positions, allowing the user flexibility not present in anything currently available. The holding device provides comfort and control when painters are using the lower thumb web gripping area. Unlike other container gripping devices for use with the thumb, the device's lower gripping area does not force the thumb to be crushed against the side of the can. The device is uniquely able to offer both upper and lower gripping options at the same time which is useful for switching hands. The user can also attach the device to multiple bucket styles. Other marketed handles cannot be installed on cans with exterior lips and even a slight motion of the handle toward the container opening will result in disengagement of these marketed handles from the adjacent installed position. The holding device solves this dangerous limitation by providing a surface that can snap under an exterior lip which creates a strong device attachment by holding the bail at a specific distance below the lip and adjacent to the can creating a strong tension in the bail and compressing the device strongly against the can. Additional features of the device allow buckets with an external lip to be held in various positions. The device can be rotated so the bucket can be held at different angles, thereby increasing the painter's comfort. By attaching a magnet to part of the device, it makes it easier to temporarily but securely store a paint brush or paint scraper over the bucket while the user is moving from one area to another, taking a break, or doing something that requires a free hand. The device can be used with alternate bucket designs, such as buckets with an external lip.

BRIEF DESCRIPTION OF THE DRAWINGS

A preferred embodiment of this invention has been chosen wherein:

FIG. 4 is a perspective side view of the holding device;

FIG. 5 is a front view of the holding device;

FIG. 6 is a side view of the holding device;

FIG. 7 is a front view of the holding device as it is installed;

FIG. 8 is a front view of the holding device as it is installed in an alternate angle;

DESCRIPTION OF THE PREFERRED EMBODIMENT

Figure 1:
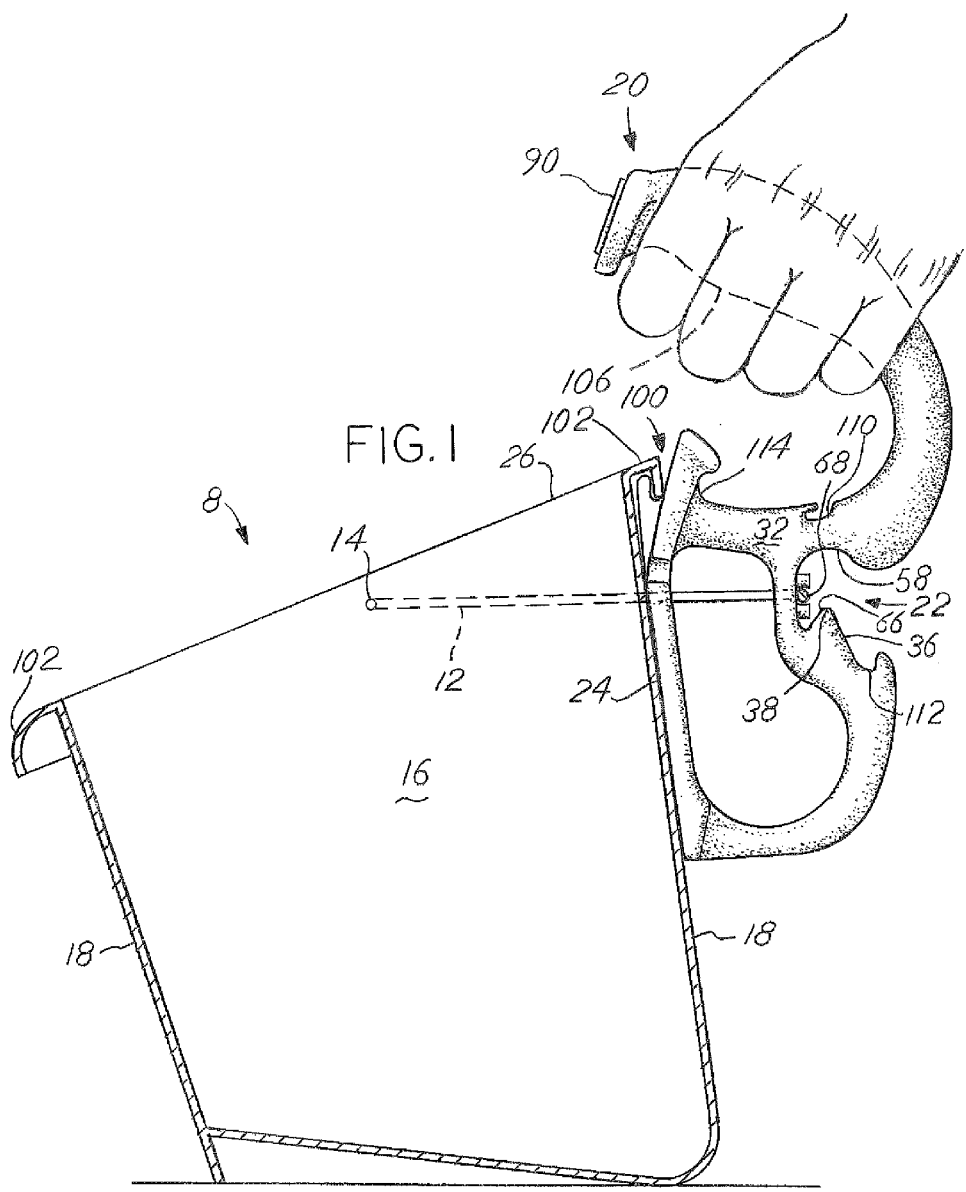
FIG. 1 is a side view of the holding device as it is installed on a lipped can.
Figure 2:
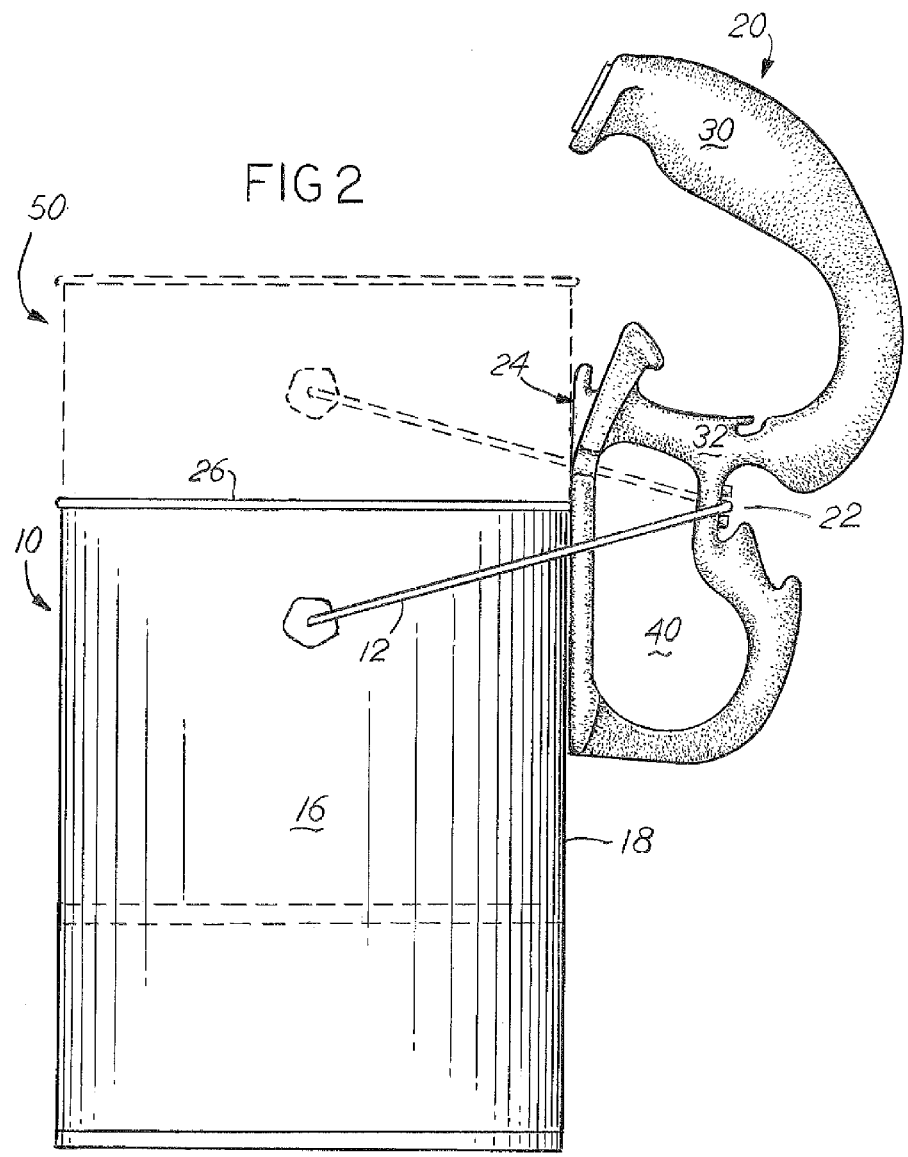
FIG. 2 is a side view of the holding device as it is installed on a non-lipped can.
Figure 3:
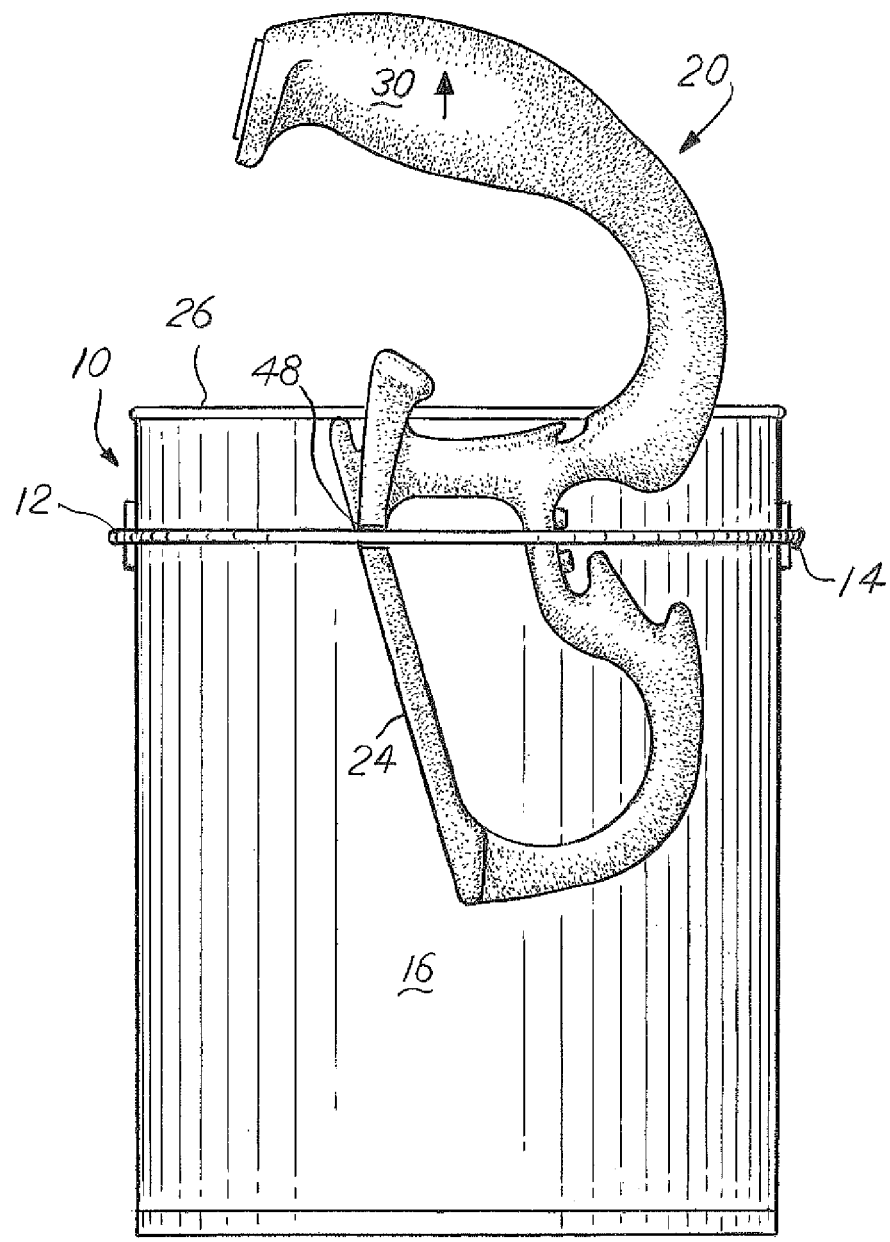
FIG. 3 is a side view of the holding device as it is installed using an alternate can facing surface.
Figure 9:
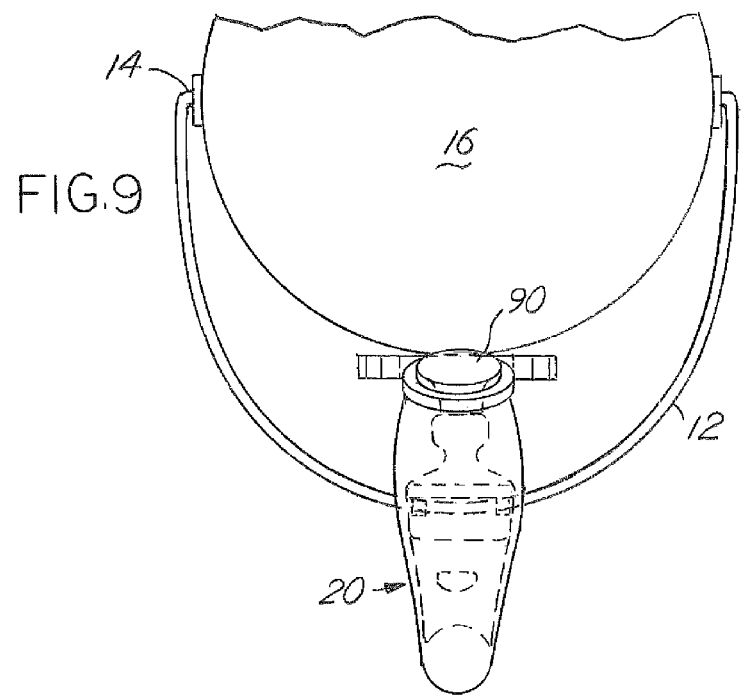
FIG. 9 is a top view of the holding device as it is installed.
Figure 10:
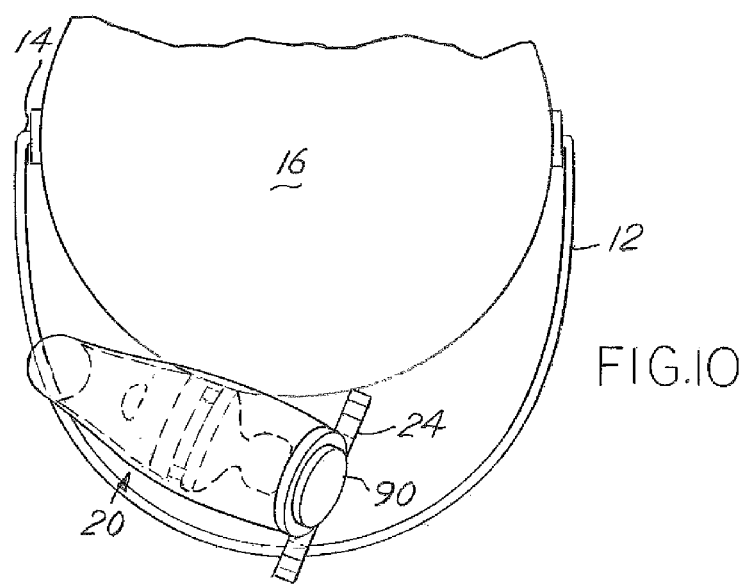
FIG. 10 is a top view of the holding device as it is installed using an alternate can facing surface.

A traditional paint can 10 as shown in FIGS. 2 and 3 has a bail 12 and a container 16 with an outside surface 18. The bail 12 pivots about the pivot points 14. The bail 12 commonly made from metal wire bent to fit into the bail pivot points 14, which are typically near the top, as is commonly known in the art. The container 16 typically is round but other shapes are possible. The bail pivot points 14 are usually opposite on the can 10 such that the bail 12 pivots symmetrically and can be placed on either side of the container. A lipped can 8 as shown in FIG. 1 contains a bail 12, a container 16, and an outside surface 18, but has a lip 102 at or near the top surface 26.

The holding device 20 in FIG. 2 is made up of a handle portion 30 and a body 32. The handle portion 30 is designed such that it can comfortably fit into a human hand. In the preferred embodiment, many surfaces above and below the bail 12 are contoured to facilitate multiple holding positions. The handle portion 30, body 32, and other surfaces can be rounded or smoothed to allow comfortable holding by the user. Grippable surfaces may have varying degrees of softness, resilience, and tactility. Some portions may be gel-filled or elastomeric rubber while other areas may be smooth polypropylene or another relatively strong and durable plastic. The handle portion 30 can be hook shaped as is shown in FIG. 1 or a continuous loop, spheroidal, or "T"-shaped but is not limited to the forms as described. The device 20 can have additional features such as slots 110, 112, 114, as shown in FIG. 1 for carrying a paint can in different orientations or multiple paint cans at the same time. A catch surface 106 on the inside of the handle allows the device to be hung from a rung or side rail of a ladder. The catch surface 106 is defined by interior surfaces of the handle portion 30 such that the device can be tilted, the side rail fits inside, and compression between the surfaces of the side rail and the catch surface 106 keep the handle portion 30 securely engaged while handle portion 30 rests on a horizontal ladder rung.

The body 32 has a first notch 22 and a first can facing surface 24 that are on opposite sides of the device 20. The notch is designed to receive the bail 12. The opening of the first notch 22 can also have a lead-in 36 to guide the bail into the notch. The notch is defined as having an upper surface 58, a lower surface 66, and an internal cavity 68. The upper surface 58 and the lower surface 66 can be made up of surfaces of a specific width and thickness to limit the travel of the bail when the device 20 is installed on a can 10 as is shown in FIG. 8. The upper surface 58 and lower surface 66 can have a restricted area 38. The restricted area 38 is located between a lead-in 36 and the cavity 68 of the first notch 22. The restricted area 38 may be slightly smaller than the cavity. The restricted area 38 could also be sized such that it causes an interference with the bail. When the restricted area 38 is sized for interference, the bail 12 passes from the lead-in 36 into the cavity 68, a small amount of pressure is required to push the bail 12 through the restricted area 38 into the cavity 68. The same would apply as the bail 12 is removed from the first notch 22. The shape of the first notch 22 and a restricted area 38 helps to retain the bail 12. The distance between the inside of the notch and the can facing surface are specific to the size and type of can. The holding device 20 can have a second can facing surface 42, FIG. 5 with a similarly designed opposing second notch 44. The distance between the second can facing surface 42 and the opposing second notch 44 is specific. It is also possible to have a third can facing surface 46 with an opposing third notch 48 and similar features to the first and second surfaces. The facing surfaces 24, 42, 46 do not need to be continuous. A surface can be a number of points to define a flat or curved contact area that will mate with the outside surface 18 of the container 16 when devise 20 is installed. The surfaces can have holes for alternate holding and installation arrangements. In the preferred embodiment, the second and third can facing surfaces 42 and 46 have a hole 40, FIG. 6 between the two surfaces such that the user can hold the device 20 in alternate orientations.

It is also possible to position the holding device 20 at various angles as shown in FIG. 8 to the central axis of the can 10 by defining the first notch 22 as shown in the preferred embodiment. The first notch 22 has a defined width that allows rotating the holding device 20 relative to the central axis of the can 16 within a certain range without disengaging the bail 12 from the first notch 22, second notch 44 and the third notch 48. The sides of the notch can be angled such that the angle of the can to first can facing surface 24, second can facing surface 42, and third can facing surface 46, relative to the axis of the can 16; is limited in either direction as is shown in FIG. 8. Through addition of protrusions 82 to the internal cavity of the first notch 22 as is shown in FIGS. 1-8, it is possible to capture the bail 12 at various angles as is shown in FIG. 8. By capturing a length of the bail between protrusions 82, it is possible to fix the angle of the can facing surface relative to the central axis of the can 16. With a can 8 that has an external lip 102 as is shown in FIG. 1 and FIG. 6, the stop 100 adjacent to the upper portion of the can facing surface 24 on the device 20 allows positioning of the holding device relative to the axis of the can.

The holding device 20 is installed on the can 10 by placing it between the bail and the can. The user selects the one of the possible orientations of the holding device 20 and placing the corresponding facing surface above the can opening and towards the can below. The bail is placed in the first notch 22 and first can facing surface 24 and is held near or on the top of the can 26. Then the holding device 20 is pivoted and slid about the top edge 26 of the container 16 until the first can facing surface 24 is between the bail 12 and the outside surface 18 of the container. An alternate installation involves using an alternate second can facing surface 42 and third can facing surface 46 and their respective second notch 44 and third notch 48. By using an alternate surface, it is possible to locate the handle portion 30 in different orientations to the can 10 as is shown in FIGS. 7 and 8. When two generally opposite surfaces are disposed for attachment, a handle then becomes reversible for use with either the left or the right hand, and the handle portion 30 can be designed for maximum comfort and ergonomic gripping angles. In the preferred embodiment, there are three can facing surfaces; first can facing surface 24, second can facing surface 42, and third can facing surface 46 that can attach to a can 16. When the can 10 is held and suspended by the holding device 20 as is shown in FIGS. 2, 3, 7, and 8, the bail is held in tension, maintaining contact between the can facing surface and the outside surface 18 of the can.

When the user sits the device 20, as attached to the can, down and it is no longer held by the holding device 20, the tension in the bail 12 is released to an extent. Then the holding device 20 may be allowed to slide down the can 16 as is shown in FIG. 2. For the purposes of simplicity, the can 10 is shown as the movable object in FIG. 2. When the device 20 is used in the down position 50 as is shown in FIG. 2, the hole 40, located adjacent to the body 32, would allow the user to support the can on the bottom with one portion of their hand and stabilize it by putting another portion of their hand through the hole 40. In the preferred embodiment, the body 32 has a hole 40 for insertion of a thumb such that the lower loop created by the hole 40 fits comfortably within the thumb web adjacent to the thumb. A painter may then place one or more fingers under the container 16 for support. A painter may also choose not to support the bottom of the can 16 with fingers and instead place a palm and fingers on the lower side surface of can 16. By utilizing the thumb web, the thumb is not strained thereby providing comfort and avoiding possible injury. In the released position 50, the shape of the sides of the notch still allows the first can facing surface 24 to pivot relative to the can 10. This pivoting gives the painter better ergonomic grasping opportunities. The device's sliding action up and down within the allowed range of motion as shown in FIG. 2 combines with the bail 12 flexibility and the notch resilience to create a springy, shock absorbing quality. This springy nature increases comfort.

Other can designs such as the can 8 shown in FIG. 1 have an external lip or ledge 102 comprised of a surface that extends out from and is attached to the outside surface 18. In FIG. 1, the outside surface 18 is shown angled forward approximately twenty degrees from vertical to shift the center of gravity of thereby provide better balance to the device and can assembly. The can opening is angled downward away from the handle to provide a larger opening for accessing the contents. The ledge 102 is usually near or at the top of the can. The ledge 102 can have a depth where a cavity formed between the inside diameter of the ledge and the outside surface 18. The depth of the cavity can vary based on can design and shape. The holding device has a stop 100 that abuts or fits inside the cavity created by the overhanging ledge 102 on the can as is shown in FIG. 1. Injection molded buckets 8 as shown in FIG. 1 have the ledge 102 at the top and the bail pivot points 14 are located in the external face of the ledge cavity. This alignment of the pivots with the top of the container results in a very different set of forces than those created by the bail geometry of a standard gallon can 10. As noted, a standard gallon can 10 with pivot points 14 set about two inches below the top surface 26 creates a maximum bail tension point when the bail is adjacent to the container and slightly above the opening plane. In contrast, when pivots are aligned with a ledge 102, there is no tension point above the ledge to maintain contact between the first can facing surface 24 and the outside surface 18. The stop 100 has a top surface 120 and can also have a wall 122 and a depression 124 as shown in FIG. 6. The top surface 120 is adjacent to the first can facing surface 24 and the wall 122 is adjacent to the top surface 120. The wall 122 is substantially parallel to or sloping away from the first can facing surface 24. Where the wall 122 meets the body 32 there is a depression 124. The wall 122 or top surface 120 is designed to mate with or abut an external ledge 102 that extends out from the outside surface 8 of the can. When the device 20 is used with a can with an external ledge 102, the top surface 120 or the depression 124 supports the weight of the can 10 and the wall 122 maintains contact between the uppermost portion of the first can facing surface 24 and the outside surface 18 of the can. For a can that has a cavity too deep for the top surface to provide support, the depression 124 supports the can. The bail 12 installed in the first notch 22 stabilizes the can. In this installation, the bail 12 is held below the top surface of the can 8. The shape of the top surface 120 and depression 124 is such that the first can facing surface 24 can be rotated relative to the axis of the can 8. One purpose of the top surface 122 is to serve as a support for the can 8 in conjunction with the first notch 22 keeping the bail 12 in tension to maintain contact between the outside surface 18 and the first can facing surface 24 when the user holds the can at an angle for pouring or tilting. The profile of the depression 124 can follow the shape of the top surface 120 to allow pivoting of the first can facing surface 24 relative to the outside surface 18. In order to remove the device from a lipped container, one must simply separate the device from its connection to the container lip and then much of the tension on the bail is released.

The body 32 or first notch 22 can be formed from a flexible material. A flexible notch or body allows the first can facing surface 24 and first notch 22 to move closer together while the user installs the device on traditional paint can 10 or a lipped can 8. The flexibility of the body 32 or first notch 22 prevents excessive tension in the bail 12 during installation or removal. Excessive tension in the bail 12 could damage the bail, rendering it useless or causing unexpected failure during use. Excessive bail tension can occur when a lipped can 8 has a large ledge 102. Standard gallon paint containers have bail pivot points that are set almost two inches below the top of the can, and this offset bail geometry creates excessive bail tension when the bail is near a ledge 102 and slightly above the container. By flexing during installation, the device 20 not only reduces the chances of damaging the bail 12, but it also retains better contact between the first can facing surface 24 and the outside surface 18 when the device 20 is installed The bail retention feature can also be made from several grooves instead of a notch, the user places the bail in one of the grooves or between the protrusions 82 based on the desired handle orientation. As with the first notch 22, second notch 44, and third notch 48, the grooves are a specific distance from the opposing can facing surface such that the bail is held in tension, and the holding device is restrained between the bail on one side and the outside surface of the container 18. The protrusions 82 or grooves prevent the axis of the can from rotating relative to the first can facing surface 24.

Other features on the holding device can include additional handle features. These include but are not limited to holes, can opener, notch 110, slots 112, 114, FIG. 6, and protruding arms. The device 20 can also include other useful features, such as loops or a catch surface 106 that can be used for hanging the device on a ladder, either by a rung using the handle portion 30 or by inserting the ladder side rail into the handle. In the preferred embodiment, the device is pivoted in relation to the can and then hooked around ladder side rail from the rear or underside. Once the device comes to rest on a rung, the handle is compressed against the interior of the side rail by gravity acting on the container. On a standard gallon can 10, a secure attachment to the ladder occurs when the container 16 is adjacent to the ladder and disposed at a slight angle toward the painter. This provides a painter with a better view of the contents of the can 10. Since the device pivots both left and right, it can be attached on either side of the ladder as the painter chooses. Optionally, a magnet 90 can be attached to the handle of the device to hold a paint brush by the ferrule.

The device can be installed on the can 10 in positions that allow the user to have free and clear access to the opening of the can at certain installed positions. In other positions, a portion of the handle may minimally extend over the can opening to adjust to the center of gravity of the combined device and can assembly or to optimize use of the magnet.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A device for holding a can having a pivoting bail capable of pivoting so that said bail may be moved to a position adjacent to said can, said device for holding a can comprising:
    a first can facing surface adapted for bracing against a can, located on a body portion defined by points contacting said can when said body portion is in contact with said can;
    a first bail receiving notch adapted for receiving said bail, said first bail receiving notch on said body portion located substantially opposite said first can facing surface and spaced therefrom by a first predetermined distance;
    a second can facing surface on said body portion defined by points contacting said can when said body portion is in contact with said can;
    a second bail receiving notch located substantially opposite said second can facing surface and spaced therefrom by a second predetermined distance;
    a handle portion, connected to said body portion.

2. The device according to claim 1, said first bail receiving notch adapted such that a central axis of said can is rotatable from a central axis of said body portion.

3. The device according to claim 1, said first bail receiving notch having plurality of protrusions, such that a central axis of said can is fixably rotated from said can facing surface.

4. The device according to claim 1, a stop, having a top surface adjacent to said first can facing surface, said stop adapted to receive an external lip of said can.

5. The device according to claim 4, said handle portion comprising a catch surface adapted for affixing said device to the side rail of a ladder.

6. The device according to claim 1, said first bail receiving notch having a restricted portion and a cavity, said restricted portion being smaller than the cavity of said notch.

7. The device according to claim 1, said first can facing surface intersecting said second can facing surface.

8. A device for holding a can having a pivoting bail capable of pivoting so that said bail may be moved to a position adjacent to said can, said device for holding a can comprising:
- a first can facing surface adapted for bracing against a can, located on a body portion, said first can facing surface being defined by points contacting said can when said body portion is in contact with said can;
- a first bail receiving notch adapted for receiving said bail, said notch on said body portion located opposite said first can facing surface and spaced therefrom by a predetermined distance;
- a second can facing surface on said body portion defined by points contacting said can when said body portion is in contact with said can, said second can facing surface intersecting said first can facing surface at a first angle;
- a second bail receiving notch located opposite said second can facing surface and spaced therefrom by a second predetermined distance;
- a third can facing surface on said body portion defined by points contacting said can when said body portion is in contact with said can, said third can facing surface intersecting said first can facing surface;
- a third bail receiving notch located opposite said third can facing surface and spaced therefrom by a third predetermined distance;
- a handle portion, connected to said body portion.

9. The device according to claim 8, said handle portion comprising a catch surface adapted for affixing said device to the side rail of a ladder.

10. The device according to claim 8, wherein said second can facing surface intersects said first can facing surface at a first angle, said third can facing surface intersects said first can surface at a second angle, said first and second angles being substantially equivalent.

11. The device according to claim 10, said first bail receiving notch adapted such that a central axis of said can is rotatable from a central axis of said body portion.

12. The device according to claim 8, said first bail receiving notch having plurality of protrusions, such that a central axis of said can is fixably rotated from said first can facing surface.

13. The device according to claim 12, a stop, having a top surface adjacent to said first can facing surface, said stop adapted to receive an external lip of said can.

14. The device according to claim 8, said handle portion comprising a magnet.

* * * * *